United States Patent [19]
Amero, Jr. et al.

[11] Patent Number: 5,903,133
[45] Date of Patent: May 11, 1999

[54] VEHICULAR BEVERAGE HOLDER AND CHARGER

[75] Inventors: Willard F. Amero, Jr., Flowery Branch; John E. Herrmann; Grant H. Lloyd, both of Lawrenceville, all of Ga.

[73] Assignee: Motorola, Inc., Schaumburg, Ill.

[21] Appl. No.: 09/027,817

[22] Filed: Feb. 23, 1998

[51] Int. Cl.[6] ........................................ H02J 7/00
[52] U.S. Cl. ........................... 320/107; 320/113; 320/115
[58] Field of Search ................................. 320/107, 112, 320/113, 114, 115; 248/311.2, 205.1

[56] References Cited

FOREIGN PATENT DOCUMENTS 10-243074  9/1998  Japan .

*Primary Examiner*—Peter S. Wong
*Assistant Examiner*—Gregory J. Toatley, Jr.
*Attorney, Agent, or Firm*—Felipe J. Farley

[57] ABSTRACT

A charger for an item to be charged is described which comprises a base fitting into an automobile beverage holder; a means for securing the base of the beverage holder, a first electrical contact on the base to supply power to the charger; a second electrical contact on the base to supply power to the item to be charged, and a receptacle in the base for holding the item to be charged. In one embodiment of the invention, the top portion of the charger has the receptacle and the first and second electrical contacts, and may be detached from the base for use as a desk charger.

9 Claims, 3 Drawing Sheets

VEHICULAR BEVERAGE HOLDER AND CHARGER

TECHNICAL FIELD

This invention relates in general to battery chargers for portable electronic devices, and more particularly to battery chargers for portable electronic devices used in automobiles.

BACKGROUND OF THE INVENTION

Battery chargers are used in portable electronic systems to charge and sometimes condition secondary batteries. Recently, emphasis on design for chargers of such systems has been on reducing their size and cost and increasing their portability. Consumer cellular telephones, notably those manufactured by Motorola, Inc., have undergone a quantum leap in recent years in their reduction in size and weight. Consumers now expect a commensurate increase in the portability of their associated charging systems. Unfortunately, no charging system for use in an automobile has proven completely satisfactory in terms of portability and convenience to the user. Therefore, there exists a need for an improved battery charger for use in an automobile.

DETAILED DESCRIPTION OF THE PREFERRED EMBODIMENT

The present invention is a charger for an item to be charged comprising a base fitting into an automobile beverage holder; a means for securing the base to the beverage holder; a first electrical contact on the base to supply power to the charger; a second electrical contact on the base to supply power to the item to be charged; and a receptacle in the base for holding the item to be charged. In one embodiment of the invention, the second electrical contact is an input for the distal end of a cigarette lighter adapter plug, or the distal end of a wall power supply adapter plug. In another embodiment of the invention, the means for securing the base to the beverage holder is one or more resilient members disposed on the exterior of the base for exerting pressure on the interior of the beverage holder. In another embodiment of the invention, the item to be charged is a portable electronic device including, but not limited to, cellular telephones, portable radios, pagers, or computers. In another embodiment of the device, the item to be charged is a battery. The present invention provides a stable, secure and easily accessible platform for charging and power conversion operations.

Figure 1:
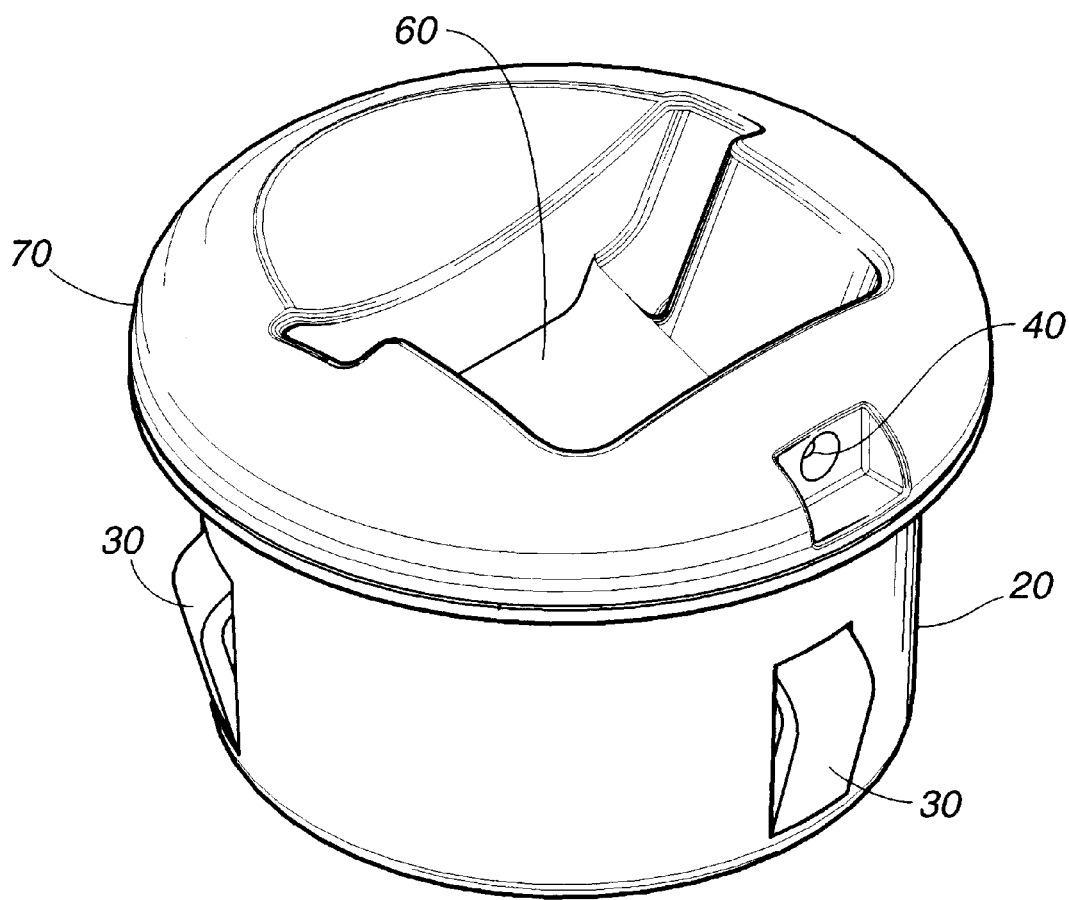
FIG. 1 is a perspective view of the charger of the current invention.
Figure 2:
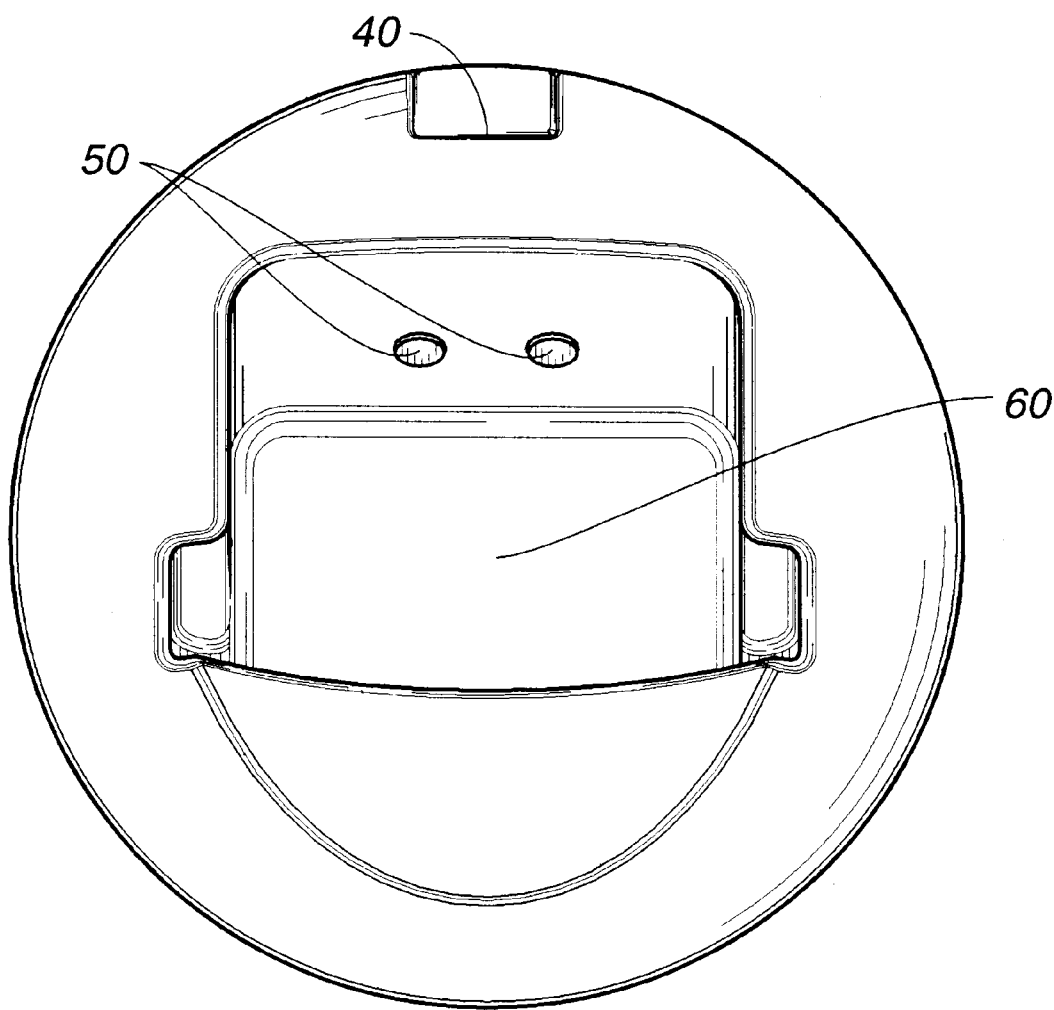
FIG. 2 is a top plan view thereof.

FIG. 1 shows one embodiment of the invention. In this embodiment, the charger (10) has a base (20) which is round, to be fitted into a round automobile beverage holder. (not shown). In this embodiment, the base (20) is round, but it can be any shape which fits into an automobile beverage holder. The means (30) for securing the base to the beverage holder are outwardly pushing grip springs. In this embodiment, the means for securing the base to the beverage holder is self-adjusting. FIG. 2 shows a top view of the embodiment shown in FIG. 1. The first electrical contact (40) on the base, to supply power to the charger (40) is an input for a cigarette lighter adapter plug or a wall power supply-adapter. The second electrical contact (50) on the base supplies power to the item to be charged. In both FIGS. 1 and 2, receptacle (60) in the base holds the item to be charged. In one embodiment of the invention, the base (20) of the charger may be constructed of a suitable durable material such as wood, metal, rubber, or plastic. The means for securing the base to the beverage holder can be constructed from any resilient material, such as rubber or metal springs. However, other means for securing the charger to the beverage holder may be employed such as clamps or grooves which might mate with corresponding grooves in the beverage holder. The charger contains electronic components sufficient to charge the item to be charged.

In the embodiments of FIGS. 1 and 2, the charger (10) has a mushroom shape given to it by the top portion here shown with a ring shape (70). The top portion in this embodiment has a mushroom shape, but it can be any desired shape. This top ring (70) can rest on the top lip of the opening of an automobile beverage holder (not shown). The electrical contacts (40), (50), in one embodiment of the invention are located toward the top of the charger (10), for easy access. However, the electrical contacts (40), (50), may be located wherever necessary, because the automobile beverage holder itself may have electrical contacts to supply power to the charger (10).

The charger is sized to fit in a beverage holder, which may have a round opening. A typical automobile beverage holder may be sized to accept a soda can, or a coffee mug, and therefore be approximately 6 centimeters in diameter. In one embodiment of the invention, the charger (10) is sized to fit in an automobile beverage can holder without the necessity of a means for securing the charger (10) to the automobile beverage holder.

Figure 3:
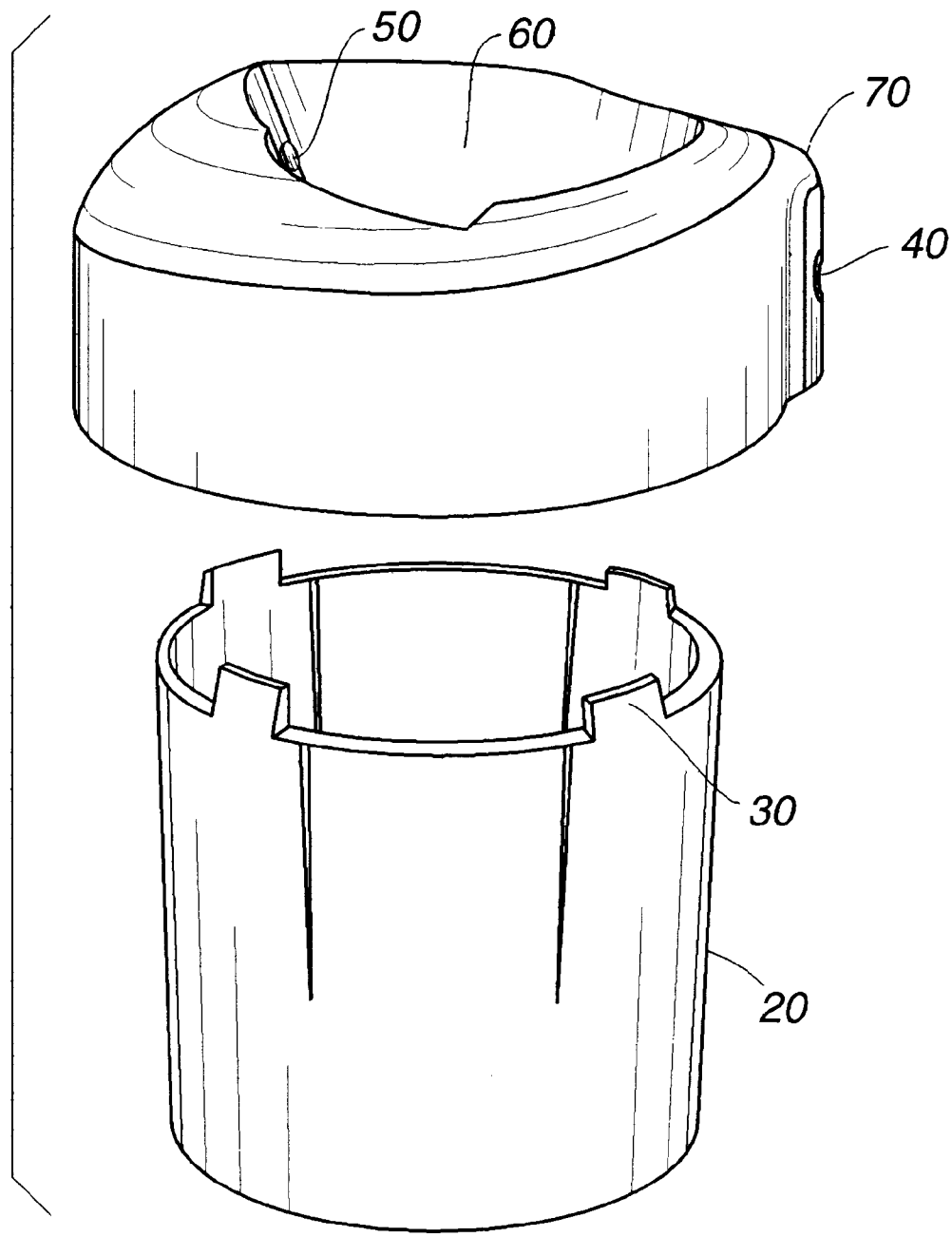
FIG. 3 is a perspective view of an alternative embodiment of the invention.

In a third embodiment of the invention as shown in FIG. 3, the top ring (70) contains the receptacle (60) and the electrical contacts (40), (50), and the charger circuitry (not shown). The top ring (70) may be of any shape, but here is shown as a ring. The top ring (70) may be detached from the base (20). When detached, it may, be placed on a desk for use as a desk charger. The top ring (70) does not necessarily impart a mushroom shape to the charger (10).

In a further embodiment of the invention, both the top ring (70) and the base (20) contain electrical contacts and circuitry.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A charger for an item to be charged, comprising:
   a. a base fitting into an automobile beverage holder;
   b. a means for securing the base to the beverage holder;
   c. a first electrical contact on the base to supply power to the charger;
   d. a second electrical contact on the base to supply power to the item to be charged; and
   e. a receptacle in the base for holding the item to be charged.

2. The charger of claim 1 where the second electrical contact is an input for a cigarette lighter adapter plug or a wall power supply adapter plug.

3. The charger of claim 1, wherein the means for securing the base to the beverage holder is one or more resilient members disposed on the exterior of the base for exerting pressure on the interior of the beverage holder.

4. The charger of claim 1, wherein the item to be charged is a portable electronic device.

5. The charger of claim 4, wherein the portable electronic device is selected from the group consisting of cellular telephones, portable radios, pagers, and computers.

6. The charger of claim 1, wherein the item to be charged is a battery.

7. A charger for an item to be charged, comprising:
 a. a base sized to fit in an automobile beverage holder;
 b. a first electrical contact on the base to supply power to the charger;
 c. a second electrical contact on the base to supply power to the item to be charged; and
 d. a receptacle on the base for holding the item to be charged.

8. A charger for an item to be charged, comprising:
 (a) a base sized to fit in an automobile beverage holder; and
 (b) a top portion detachably connected to the base, comprising
  (i) a first electrical contact on the top portion to supply power to the charger;
  (ii) a second electrical contact on the top portion to supply power to the item to be charged; and
  (iii) a receptacle in the top portion for holding the item to be charged.

9. The charger of claim 1, further comprising a means for securing the base to the beverage holder.

\* \* \* \* \*